Aug. 3, 1965   B. L. BRUCKEN ETAL   3,198,333
FILTER FOR DOMESTIC APPLIANCE
Filed Jan. 2, 1962   4 Sheets-Sheet 1
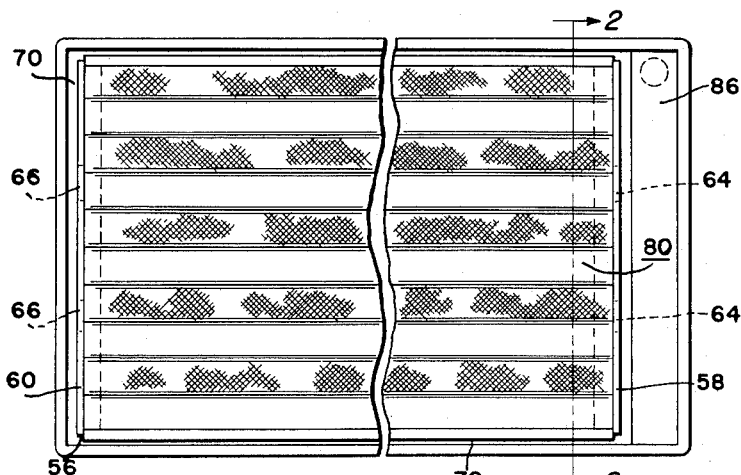
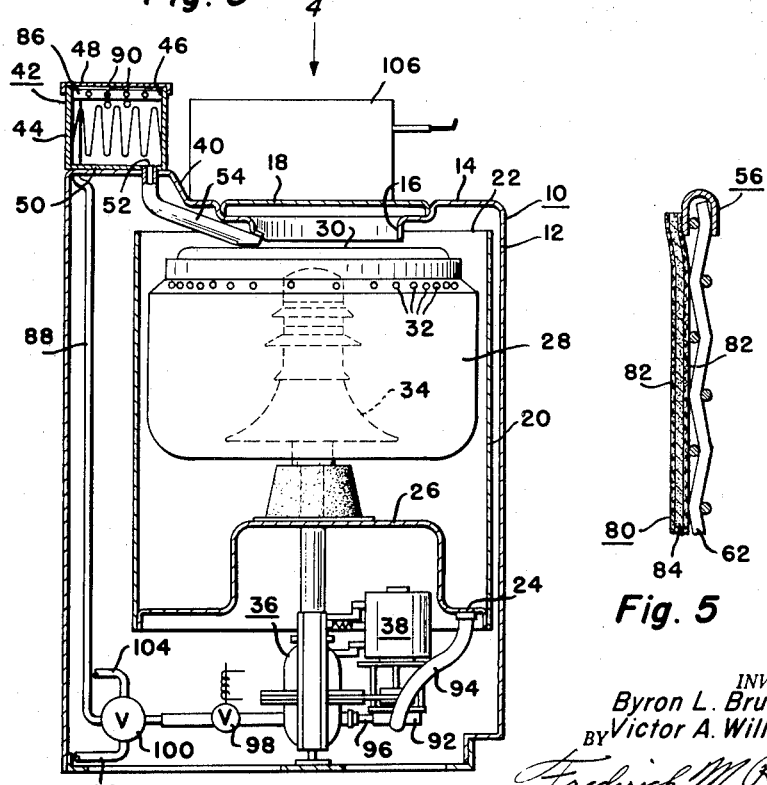
INVENTORS
Byron L. Brucken
Victor A. Williamitis
BY
Their Attorney Aug. 3, 1965

B. L. BRUCKEN ETAL 3,198,333

FILTER FOR DOMESTIC APPLIANCE

Filed Jan. 2, 1962

INVENTORS
Byron L. Brucken
BY Victor A. Williamitis

Frederick M. Ritchie
Their Attorney

Aug. 3, 1965   B. L. BRUCKEN ETAL   3,198,333
FILTER FOR DOMESTIC APPLIANCE
Filed Jan. 2, 1962   4 Sheets-Sheet 3

INVENTORS
Byron L. Brucken
Victor A. Williamitis
BY Frederick M. Ritchie
Their Attorney INVENTORS
Byron L. Brucken
Victor A. Williamitis
BY
Their Attorney United States Patent Office 3,198,333
Patented Aug. 3, 1965

3,198,333
FILTER FOR DOMESTIC APPLIANCE
Byron L. Brucken and Victor A. Williamitis, both of Dayton, Ohio, assignors to General Motors Corporation, Detroit, Mich., a corporation of Delaware
Filed Jan. 2, 1962, Ser. No. 163,803
3 Claims. (Cl. 210—209)

This is a continuation-in-part of our copending application Serial No. 105,670, filed April 26, 1961 now U.S. Patent No. 3,133,286 (granted May 12, 1964).

This invention relates to a domentic appliance and more particularly to an improved replaceable paper filter for a coin operated dry cleaning machine.

In dry cleaning apparatus, it is desirable to maintain the solvent in a suitably filtered or uncontaminated condition in order that the clothes are cleaned efficiently. Where a domestic appliance is adapted for use interchangeably as a clothes washer or a dry cleaning apparatus, it is desirable to locate the solvent filter for the dry cleaning apparatus in a readily accessible position.

Accordingly, it is an object of this invention to adapt a clothes washing machine for dry cleaning.

Another object of this invention is the provision of a solvent filter in the console of a washing apparatus.

Another obpect of this invention is the provision of a readily accessible and disposable filter insert for the console of a dry cleaning apparatus.

It is a further object of this invention to provide a dry cleaning apparatus with a filter above the spin tub such that a continuous overflow of solvent may be effected throughout an agitate period.

A more specific object of this invention is the provision of an elongated accordion-pleated removable support element for a filter sheet in the console of a washing apparatus.

Another object of this invention is the provision of a replaceable accordion-pleated paper filter cartridge for a liquid dry cleaning solvent, said paper being impregnated with a lignite carbon complex for sorbing dyes from the solvent.

A more general object of this invention is the provision of formable paper filter sheeting which has variably diffused throughout its cross section a surface active agent for absorbing dyes.

Still another general object of this invention is the provision of a disposable filter insert for removing particulate matter from a circulating dry cleaning solvent, said insert having intimately and integrally retained therein additional solvent treating agents for conditioning the solvent for the dry cleaning process.

Further objects and advantages of the present invention will be apparent from the following description, reference being had to the accompanying drawings wherein preferred embodiments of the present invention are clearly shown.

In the drawings:

FIGURE 1 is a schematic side sectional view, partly in elevation, of a dry cleaning apparatus suitable for use with this invention.

FIGURE 3 is a fragmentary top elevational view of this invention with the filter container cover removed.

FIGURE 5 is an enlarged sectional view of the disposable filter and the removable filter support.

Figure 2:
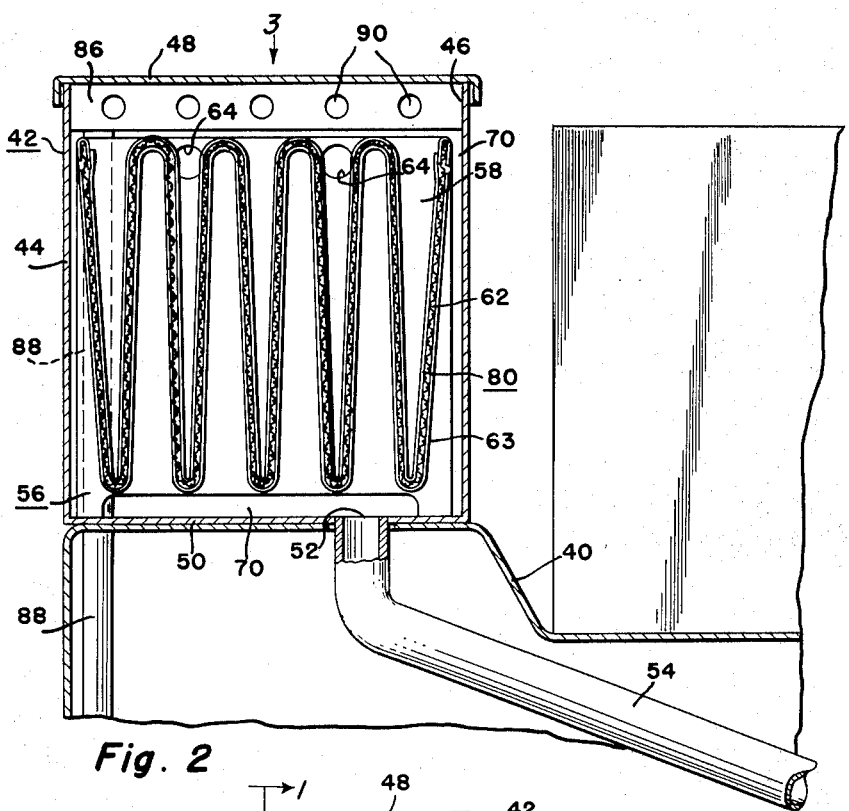
FIGURE 2 is a fragmentary sectional view, partly in elevation, taken along line 2—2 in FIGURE 3 to show the removable filter support arrangement of this invention.

In accordance with this invention and with reference to FIGURE 1, a washing apparatus 10 is illustrated as adapted for use as a dry cleaner. The washer 10 is comprised of an outer casing 12 having a top wall 14 and an access opening 16 which is closed by a hinged access lid 18. Within the outer casing 12 is disposed a cyclindrical solvent container 20 which is imperforate except for a top opening 22 and a bottom outlet 24 at the lowest point thereof. A central bulkhead 26 serves to support a spin tub 28 for rotation within the solvent container. The spin tub 28 has a top access opening 30 in axial alignment with the cabinet opening 16 and a plurality of circumferentially arranged outflow ports 32. Within the spin tub 28, an agitator 34 is located. Beneath the bulkhead 26 and suspended thereby is an agitating and spinning mechanism shown generally at 36 which is adapted to selectively rotate the spin tub 28 when the mechanism motor 38 is rotating in one direction and to vertically reciprocate the agitator 34 when the motor 38 is reversed. For further details pertaining to the agitator and spinning mechanism 36, reference may be had to the Sisson Patent 2,758,685, issued August 14, 1956.

Figure 4:
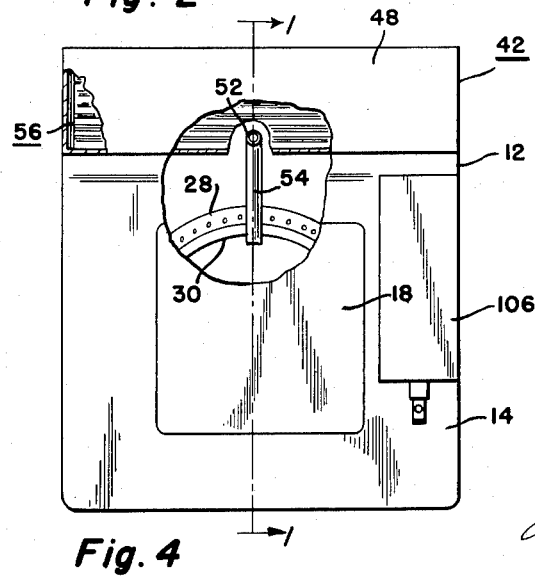
FIGURE 4 is a top elevational view of the dry cleaner of this invention with parts broken away.

Turning now to FIGURES 1 and 4, the top wall 14 of the casing 12 is shown with a raised rear console support portion 40 on which is supported a console filter container or box shown generally as 42. The console filter is comprised of a box-like filter container 44 having a top opening 46 closed by a removable cover 48. The bottom wall 50 of the filter container is imperforate except for an outlet opening 52 which is connected by a supply conduit 54 in overlying relationship with the top opening 30 of the spin tub.

When the filter container cover 48 is removed, the filter container is adapted to receive a box-like filter support frame 56 comprising a pair of end plates 58 and 60 between which extends a serpentine or accordion-pleated reticulated support form or screen 62. The screen rests at its opposite ends on complementary shoulders 63 fastened as by welding to each end plate. Each end plate may also include overflow by-pass ports such as 64 and 66 respectively. This provides for by-passing solvent around the filter in case the supply to the filter is greater than the filter capacity as will be understood more fully hereinafter. The filter frame 56 is generally rectangular in form and of smaller dimension than the filter container 44 such that the filter frame is spaced from the container about its periphery to form a clearance 70 between the filter frame and the container.

In considering a self-contained dry cleaning and solvent purifying system such as set forth for the apparatus 10, it appears that sorption and filtration can be an effective and economical manner of maintaining a solvent in an uncontaminated condition. The materials to consider in dry cleaning for use in filtration of lint, dirt solids, organic acid and even some of the cleaned off oil and grease are activated carbon, fuller's earth, bauxite and similar sorbing clays, treated or untreated, diatomaceous earth, magnesium oxide, silica gel, alumina and molecular sieve. Actually a mixture of these would serve best. Activated charcoal should be included as the most potent scavenger for any dyes removed from clothing. Magnesium oxide would be included as a preferred agent for sorbing any free fatty acid. The acid clays such as fuller's earth would be economic sorbers of some of the general oil and grease. The diatomaceous earth would assist in building a free-flowing filter. A combination or composite of the above elements (FIGURE 5) would be formed into a suitable filter sheet or ribbon 80 having a porous paper backing 82 for retaining in sandwiched relation the filter composite 84. Thus, a sheet of the filter 80 as wide as the support 56 can be pressed downwardly into coextensive engagement with the support screen 62 on the filter frame. The sheet of filter paper 80 may be replaced as often as necessary to provide for effective filtration of the recirculating solvent.

Completing the solvent circulating system and with reference to FIGURES 1, 2 and 3, a solvent distribution header 86 is illustrated at one end of the filter container 42. The filter header is supplied by way of a supply conduit 88 and includes a plurality of solvent spray ports 90 above the top of the filter frame 56. A pump 92 is connected by a conduit 94 to the solvent container 24 and includes a pump outlet 96 which is connected to the header supply conduit 88 through a solenoid operated valve 98 (for retaining the solvent in the solvent storage container 20 when the equipment is not in operation) and a three-way valve 100 (for selectively directing the solvent to a waste drain 102, the filter chamber 42 or a solvent make-up line 104).

In operation, clothes are placed through the access opening 16 into the spin tub 28 and the cleaning cycle initiated through any conventional coin operated timing mechaism such as 106. The pump 92 will be operated by the motor 38 to circulate the solvent from its storage in the container 20 to the spin tub 28 as follows: The valve 98 will be in an open condition and the solvent will be pumped through the three-way valve 100 to the header supply conduit 88. The solvent will enter the filter container 44 at the solvent distribution header 86 and will be distributed substantially equally about the top of the accordion pleats or folds of the filter 80. The solvent will flow by gravity through the filter element 80, returning to the filter container or box 44 along the bottom wall thereof from which point it will drain by gravity through the conduit 54 to the spin tub. Should the pump 92 supply solvent to the filter container 44 faster than it can flow through the filter element 80, the level of the solvent will rise until it reaches the by-pass ports 64, 66. Then the solvent will flow around the filter 80 by overflowing the filter support 56, thereby going directly to the spin tub 28 without filtration. Periodically, it will be necessary to remove the cover 48 of the filter container and strip off the contaminated filter paper. A new strip of filter paper will be pressed into engagement with the folds of the support screen to place the equipment in condition for additional dry cleaning cycles.

Figure 7:
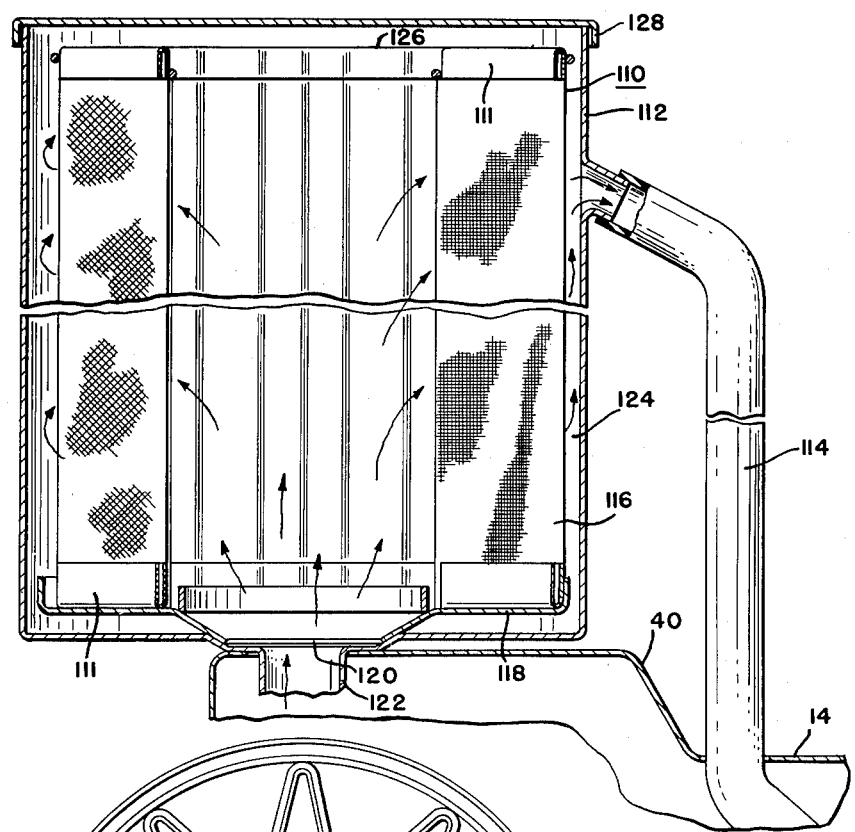
FIGURE 7 is a fragmentary sectional view of the filter taken along line 7—7 in FIGURE 6 and installed on a dry cleaning apparatus.
Figure 6:
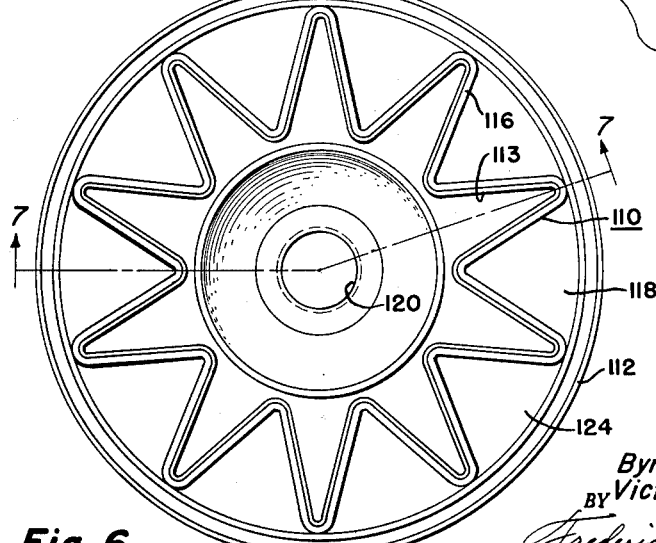
FIGURE 6 is a top elevational view of another embodiment of this invention with its cover removed.

With reference to FIGURES 6 and 7, a round star-shaped cartridge or canister 110 is illustrated which inserts within a cylindrical filter container 112 positioned on the washer console. As with the preferred version, the filtered fluid returns by gravity to the spin tub by way of a conduit 114. More particularly, the filter cartridge 110 is formed by a folded or pleated support screen 116 held together at the top and bottom by a reinforcing strip 111. Filter paper 113 such as used on the preferred version is adapted to be pressed into engagement with the radially inner side of the screen. The cartridge is carried on a generally imperforate circular bottom support plate 118 having an inlet port 120. Solvent is pumped through a conduit 122 into the center of the filter cartridge 110 and flows as shown by the arrows radially outwardly through the filter element 113 and the screen 116 into the clearance space 124 between the filter cartridge and the cylindrical container 112. As with the preferred version, a by-pass arrangement is effected since the top 126 of the filter cartridge 110 is open to permit a solvent oversupply to overflow the top of the cartridge in passing directly to the tub. Here, also, the cartridge 110 is removable so that the filter 113 may be stripped from the support screen 116 and replaced with a fresh filter.

Figure 8:
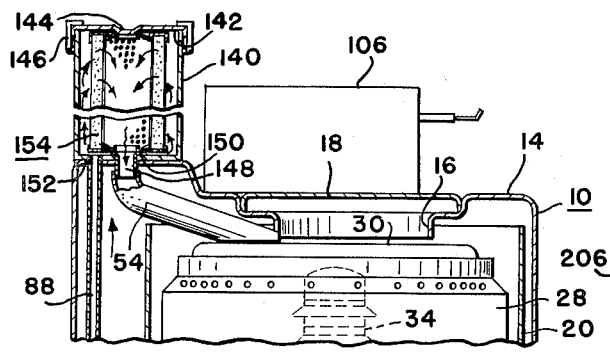
FIGURE 8 is a fragmentary side sectional view, partly in elevation, of the dry cleaner of FIGURE 1 adapted for use with a third filter embodiment of this invention.

Another aspect of this invention wherein dry cleaning additives are combined into a replaceable filter cartridge is shown in FIGURES 8, 9, 10 and 11. Referring now to FIGURE 8, the dry cleaner 10 includes on the console thereof a cylindrical container or housing 140 having a top opening 142 closed by a cover 144. The cover 144 is generally imperforate and is retained securely on the filter container 140 by clamps 146. The filter container 140 includes an outlet port 148 defined by a raised rib 150 which connects with the supply chute 54 for supplying filtered and decontaminated or conditioned solvent to the spin tub or cleaner basket 28. Contaminated solvent is returned through the supply conduit 88 to an inlet opening 152 in the bottom of the filter container 140.

The removable and disposable filter element 154 is insertible through the opening 142 in the filter container. The filter 154 is comprised of a metallic generally circular top plate or support 156 and a metallic bottom circular plate or support 158 spaced from the upper plate by a perforated cylinder 160 of metal, hardboard or other suitable material. A ring-like bail or handle 162 is welded as at 165 to the top plate 156 and half thereof may be bent away from the surface of the plate in order to provide a handle for removing the filter cartridge 154. Each plate 156 and 158 is formed with an up-turned annular flange 164 and 166 and a radially inner rib 168 and 170 for nesting therebetween an annulus of folded or accordion-pleated filter paper 172.

The accordion-pleated filter paper is formed with radially inner folds 174 touching the outside of the perforated cylinder 160 while the outer edge of the folds 176 is retained within the peripheral edge flange 164 and 166 of the oppositely facing end plates 156 and 158. A bed of thixotropic epoxy cement or other suitable adhesive is formed within the annular channel 178 and 180 on each of the end plates to retain the ends of the filter pleats in sealing engagement.

To form the accordion pleats, a strip of filter paper as wide as the filter cartridge is tall is formed into a series of consecutive pleats or folds having a depth equal to approximately ¼ the diameter of the filter cartridge. The folded sheet of filter paper is then formed into an annulus or cylinder in a manner to place the terminal portions or sheet ends 184 and 186 in juxtaposition. These terminal portions are interlocked and a plurality of staples 188 positioned in spaced relationship along the length of the fold to hold the filter paper in proper relation to the end plate and to provide a seal along the joined edges. The proportions of the fold to the overall diameter of the filter cartridge are determined at ¼ of the diameter in order to realize a maximum paper surface area available for effective filtering. For instance, where the cartridge 154 is 14⅜ inches in length and 7¹³⁄₁₆ inches in diameter, one hundred and forty quarter-diameter folds of filter paper are necessary to provide approximately fifty square feet of filter surface in the cartridge. This filter paper surface area has been determined as sufficient to process adequately a six gallon per minute solvent flow through the filter cartridge.

The bottom plate 158 in the filter cartridge has an in-turned collar 190 to form a filter outlet and a rib 192 which mates with the filter container rib 148 to form a metal to metal seal between the filter container and the filter cartridge. For simplicity in manufacture, the opposite end plate 156 is also formed with a collar 194 so that only one end plate die is necessary. The cover 144 includes a central recess which nests in sealing engagement with the collar 194 so that the solvent flow is from the radially outer side of the filter cartridge through the folds of the filter paper to the perforated cylinder 160. From this point the filtered and decontaminated or treated solvent flows by way of the outlet port 190 in the bottom end plate 158 to the supply chute 154 leading to the spin tub.

In the first mentioned embodiments of this invention, the various additives necessary for treating dry cleaning solvent are held physically between spaced laminations of filter paper (FIGURE 5). In this arrangement, the spacing of the paper laminations is important for retaining the composite of dry cleaning solvent treating agents within the filter sheet at a consistent thickness and with the agents properly proportioned. On the other hand, in the embodiment of FIGURE 11, the activated carbon or charcoal particles are actually held mechanically by and interspersed between the multitude of fibers in the paper. Thus, the construction of the filter sheet is reduced to the ultimate in simplicity.

Figure 11:
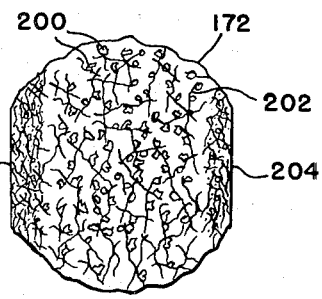
FIGURE 11 is an enlarged cross sectional view of the filter paper sheet used in the filter cartridge of FIGURE 9.
Figure 9:
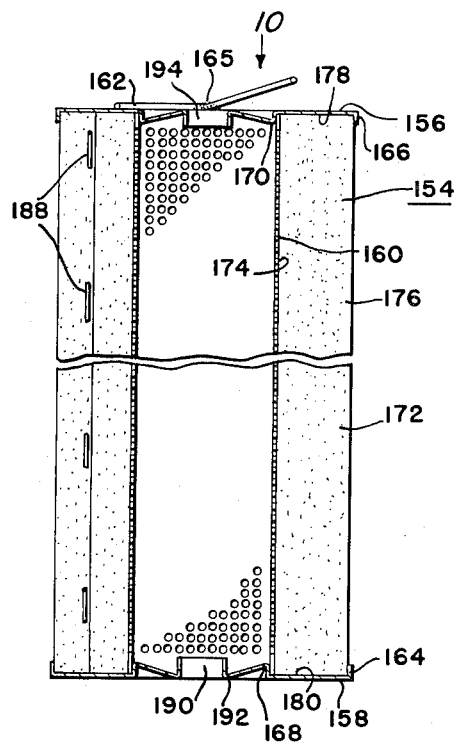
FIGURE 9 is a fragmentary side sectional view, partly in elevation, of the filter cartridge in FIGURE 8.
Figure 10:
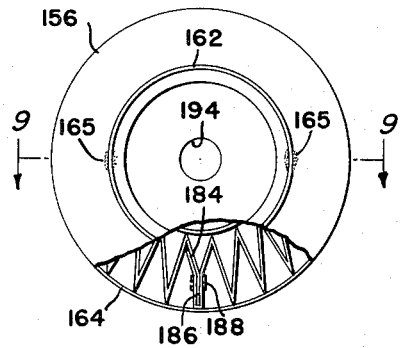
FIGURE 10 is a top elevational view, with parts broken away, of the filter cartridge of FIGURE 9.

The cross section of the filter paper 172 is shown in FIGURE 11 to include the solvent treating agent particles 200, such as activated carbon, and the paper fibers 202, such as cotton linters or the like. Note that the fibers 202 are generally more dense near each surface 204 and 206 of the filter sheet, whereas the treating agent particles 200 are most concentrated in the center of the sheet. In other words, the relative amount of fibers to carbon particles is very great at the paper surface; whereas, centrally, the fiber-carbon particle ratio changes more nearly to that ratio of the total mixture proportions, as will be understood more fully hereinafter. Such construction forms a rather diffused and dispersed lamina which keeps the treating agent generally remote from the surface of the filter sheet and facilitates cleanliness in handling the filter paper. Further, where a surface active agent or adsorber such as activated carbon is used, the more that the carbon particles 200 are dispersed, the more will be the exposed reacting surface of the particle. There is also less tendency for the carbon to dust off of the filter paper and, therefore, there is a minimum loss of carbon. Still further, such particle dispersal makes the paper more pliable and therefore more processible into folds for the filter cartridge. Since less carbon is required in a given sized filter cartridge with the dispersed form, filter cartridge cost is held to a minimum. The reason that the carbon particles are so efficiently used is simply that the particles are in fine or powdered form and so completely dispersed and suspended by the paper fibers that the maximum carbon particle surface is exposed to sorb dyes from solvent moving through the filter paper.

One method of making the filter paper 172 is as follows. Using the well-known Fourdrinier paper making process, a homogeneous suspension or slurry of paper pulp, in water, is fed from the beaters to the endless screen belt portion of the Fourdrinier machinery. A short distance downstream from the introduction of this paper pulp slurry and shortly after the paper fibers start to settle, a water-carbon slurry is introduced uniformly at or over the surface of the pulp slurry while the paper fibers are still settling into a mat on the moving and laterally vibrating screen. Paper fibers settle from the pulp slurry both above and below the carbon. Thus, a paper mat continues to build up as the fibers and carbon settle and a filter sheet is formed which, when evacuated of moisture and dried, provides the structure shown in FIGURE 11.

Continuing the disclosure of the filter sheet structure of FIGURE 11, assume for purposes of clarity that 204 is in the bottom surface of paper forming by the Fourdrinier process and that 206 is the top surface thereof. The dense fiber layer (relatively little carbon) at the surface 204 is due to the advance settling of paper fibers from the pulp slurry which initiates the formation of the paper mat before the carbon particle slurry is introduced. A rather thin skin of intertwining fibers is thereby adapted to receive the first settlings of carbon particles from the mixture of pulp slurry and carbon slurry above. Since the carbon particles are heavier than the paper fibers, the carbon will settle more quickly onto the initial paper mat formation and a dense carbon layer (relatively little fibers) next forms as the result of the variable settling rates of carbon and fiber. Lastly, and after most of the carbon particles have settled into the center layer or laminate, the filter sheet is completed as the settling process concludes with a dense fiber layer (relatively little carbon) forming the top surface 206. Thus, as evidenced by the somewhat exaggerated representation of FIGURE 11, a generally laminate filter sheet results (fiber-carbon-fiber), but wherein lesser amounts of carbon are dispersed throughout the outer fiber skins while lesser amounts of fiber permeate the center of the paper for retaining and spacedly supporting the predominant carbon particles for maximum surface exposure to sorb dyes from the solvent being filtered. Other granular solvent treating agents could be formed into filter paper in essentially the same manner.

By way of example, but not by way of limitation, the solvent treating agent 200 used with the filter paper may be a powdered Darco Blue Label activated carbon available from the Darco Chemicals, Division of the Atlas Powder Company. The sieve analysis of the powdered carbon under the U.S. Standard Sieve Rating is as follows:

|     |     | Percent |
| --- | --- | --- |
| (A) | Retained on 100 mesh (0.0040 inch) | 1.58 |
| (B) | Retained on 140 mesh (0.0041 inch) | 12.20 |
| (C) | Retained on 170 mesh (0.0035 inch) | 41.10 |
| (D) | Retained on 200 mesh (0.0029 inch) | 5.24 |
| (E) | Retained on 230 mesh (0.0024 inch) | 19.30 |
| (F) | Retained on 325 mesh (0.0017 inch) | 14.10 |
| (G) | Through 325 mesh | 0.40 |
| (H) | 6% was held up in the sieve screens. | |

The foregoing analysis of carbon was introduced separately as a water slurry of carbon to the screen belt of the Fourdrinier machine after the pulp had already been placed on the screen. The side shake of the screen provided essentially a laminate of fibers-carbon-fibers with a carbon retention of 80% to 99% by weight. The above sieve analysis carbon was chosen as most suitable for dispersal in the additive-type filter paper of this invention. Substantially larger carbon particles would make the paper too open and therefore not a good filter. Substantially smaller carbon particles would tend to plug the pores of the paper and would therefore prevent high speed filtration.

The fibrous material 202 in FIGURE 11 may be either cotton linters or cellulose fibers combined with a highly hydrating substance such as Du Pont HS–1 fibril—the latter serving to shrink, when dry, into locking engagement with the fibrous material and, thereby, enhance the tensile strength and stiffness of the filter paper.

The filter paper 172 used on the filter cartridge 154 has preferred filter making characteristics, when its original base weight, including the retained carbon particles, is 140 pounds per 3000 square feet of filter paper. The slurry of paper pulp, without carbon, includes, by weight, approximately 85% to 95% of paper fibers (cotton linters or cellulose fibers) plus 5% to 15% of HS–1 fibril. Carbon, weighing approximately 50% of the base weight of paper fibers and fibril, is then added to the slurry. The filter paper has an "Air" rating of 8 millimeters of water pressure. The "Air" is the pump pull, in millimeters of water pressure, that it takes to flow 85 liters per minute through a hundred square centimeter circle of the filter paper; thus, the higher the "Air" rating, the more dense the paper.

In summary, filter paper made in accordance with the teachings of this invention and weighing 140 pounds per 3000 square feet preferentially includes 70 to 75 pounds of paper fibers and approximately an equal quantity of Darco Blue Label activated charcoal. More particularly, carbons made from lignite are preferred in the manufacture of the filter paper of this invention.

In the manufacture of the filter paper, resin coated fibers are useful in conjunction with the surface active materials, however, no resin coating on the charcoal carbon or sweetner can be tolerated. This is accomplished by utilizing a water soluble phenolic resin added to the beater on the Fourdrinier machine which coats the cotton linters or fibers before the carbon is introduced to the mat, thereby effecting an uncoated carbon particle. Whether coated or uncoated paper fibers are used, the pore size of the paper-additive composite desired should be a nominal 20 to 25 microns with a useful range of from 1 to 35 microns of opening size. This dimension is of practical significance to the size of particles which can pass through the filter paper used on the accordion-pleated element 154.

Although the foregoing has disclosed one method of making a solvent filter paper carrying a diffusion or dispersion of activated carbon particles therein, it should be recognized that other dry cleaning additives or solvent treating agents such as mentioned earlier in this specification could be used and dispersed in the same manner throughout the filter sheet construction shown in FIGURE 11.

It should now be seen that an improved dry cleaning apparatus has been devised wherein a pre-built filter element is self-contained and readily accessible for easy replacement.

While the embodiments of the present invention as herein disclosed constitute preferred forms, it is to be understood that other forms might be adopted.

What is claimed is as follows:

1. A dry cleaning solvent filter for removing particulate matter and treating a liquid dry cleaning solvent and comprising a filter container having a container adapted to receive solvent returning from a dry cleaning apparatus and a container outlet adapted to supply said dry cleaning apparatus with filtered and treated solvent, said container having an opening and a cover for closing said opening, and a filter cartridge insertible through said opening, said cartridge including a bottom plate having a filter outlet port, a top plate effectively imperforate and in spaced parallel relationship to said bottom plate, a perforated cylinder perpendicular to said plates and extending therebetween with one end thereof in communication with said filter outlet port and a longitudinally extending accordion-pleated annulus of filter paper sheeting interposed in sandwiched relationship between said plates, said accordion-pleated annulus having a creased radially inner fold engaging said perforated cylinder and a creased radially outer fold extending substantially to the periphery of said plates, said folds forming a partition having an inside wall in communication with said filter outlet port through the perforations of said cylinder and an outside wall in communication with said container inlet, said filter paper sheeting comprising an integral filtering mat of interwoven paper fibers throughout for removing particulate matter from said solvent and a particulate surface active agent, the particles of which are variably dispersed throughout said mat from one outer surface thereof to the other outer surface thereof for treating said solvent, said paper fibers being more dense near each surface of said filter paper sheeting, and the particles of said surface active agent being more dense in the center of said filter paper sheeting remote from the surfaces to facilitate the retention of said particles in said filter paper sheeting when said sheeting is folded.

2. A dry cleaning solvent filter materials for liquids defined by a unitary sheet including depth filter means comprising an integral filtering mat of interwoven fibers throughout for removing particulate matter from said liquids, and liquid conditioning means for treating said liquids, said liquid conditioning means comprising particles being held by said depth filter means in dispersed relationship throughout said unitary sheet from one outer surface thereof to the other outer surface thereof, the fibers of said depth filter means being more dense near each surface of said sheet, and said liquid conditioning means being more dense in the center of said sheet remote from the surfaces thereof to facilitate the retention of said liquid conditioning means in said sheet.

3. A dry cleaning solvent filter for removing particulate matter and treating a liquid solvent and comprising a filter container having a container inlet adapted to receive contaminated solvent and a container outlet adapted to supply filtered and treated solvent, said container having an opening and a cover for closing said opening, and a filter member insertible and removable through said opening, said filter member including a support and a filter paper portion carried by said support, said filter paper portion forming a partition having one side in communication with said container outlet and another side in communication with said container inlet, said filter paper portion defined by a unitary filtering sheet comprised of interwoven cotton linters throughout for removing particulate matter from said solvent and activated carbon particles interposed among said linters from one outer surface of said filtering sheet to the other outer surface thereof and positioned thereby for treating said solvent, said cotton linters being more dense near each surface of said filtering sheet, and said carbon particles being more dense in the center of said filtering sheet remote from the surface thereof to facilitate the retention of said carbon particles in said filtering sheet.

References Cited by the Examiner

UNITED STATES PATENTS

| 2,218,800 | 10/40 | Williams | 210—438 |
| 2,343,437 | 3/44 | Wells | 210—502 X |
| 2,413,954 | 1/47 | Conterman | 210—451 |
| 2,708,982 | 5/55 | McGuff | 210—505 X |
| 2,796,989 | 6/57 | Kovacs. | |
| 3,019,127 | 1/62 | Czerwonka | 210—502 X |

FOREIGN PATENTS 1,130,459  9/56  France.

REUBEN FRIEDMAN, *Primary Examiner.*

GEORGE D. MITCHELL, HERBERT L. MARTIN,
*Examiners.*